United States Patent [19]
Hakogi

[11] Patent Number: 5,107,535
[45] Date of Patent: Apr. 21, 1992

[54] CONNECTING METHOD BETWEEN WAVEGUIDE SUBSTRATE AND OPTICAL FIBER

[75] Inventor: Hironao Hakogi, Kawasaki, Japan
[73] Assignee: Fujitsu Limited, Kawasaki, Japan
[21] Appl. No.: 608,745
[22] Filed: Nov. 5, 1990

[30] Foreign Application Priority Data

Nov. 8, 1989 [JP] Japan ................................ 1-288731

[51] Int. Cl.⁵ ............................................ G02B 6/30
[52] U.S. Cl. ............................... 385/49; 385/14; 359/900
[58] Field of Search ............... 385/14, 15, 39, 49, 385/52, 130, 131, 132

[56] References Cited

U.S. PATENT DOCUMENTS

4,767,174 8/1988 Carenco ............................ 385/49
4,871,226 10/1989 Courtney et al. ................. 385/49

*Primary Examiner*—Frank Gonzalez
*Assistant Examiner*—John Ngo
*Attorney, Agent, or Firm*—Staas & Halsey

[57] ABSTRACT

A method of connecting a waveguide substrate made of electro-optical crystal and an optical fiber by means of a bonding agent of the ultraviolet light curing type is disclosed. According to the method, first, a reflection preventing film with an ultraviolet light intercepting function of passing therethrough light of a wavelength to be transmitted by way of the optical fiber but intercepting ultraviolet rays of a wavelength with which a bonding agent is to cure is formed on an end face of a waveguide substrate. Then, an end face of the optical fiber is closely contacted with the reflection preventing film with the bonding agent applied to the end face of the optical fiber, and ultraviolet rays are irradiated upon the end face of the waveguide substrate from the side on which the reflection preventing film is formed to cause the bonding agent to cure. Also detailed layer structures of such reflection preventing film with an ultraviolet light preventing function are disclosed.

10 Claims, 7 Drawing Sheets

FIG. IA PRIOR ART
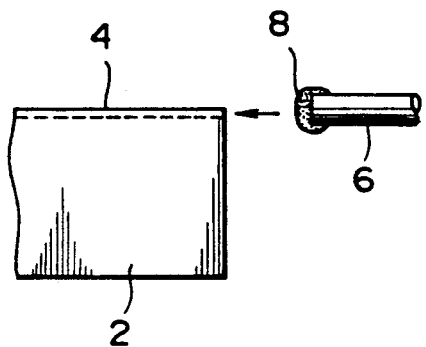
FIG. IB PRIOR ART
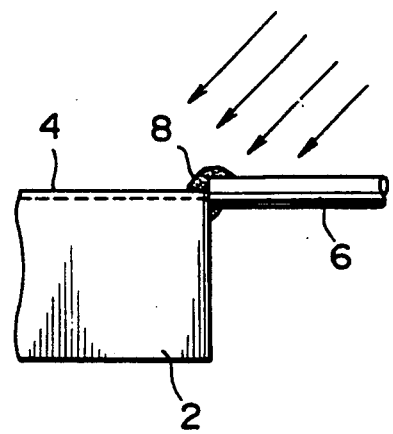
FIG. 2
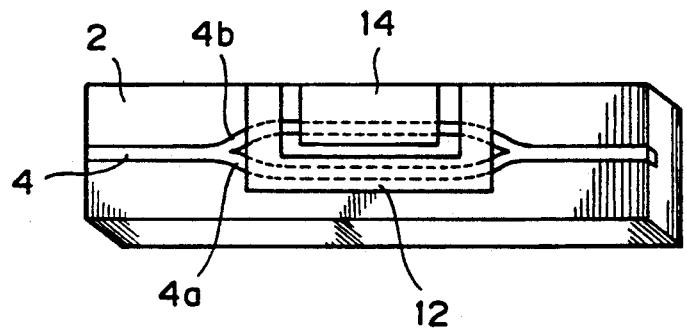
FIG. 3A
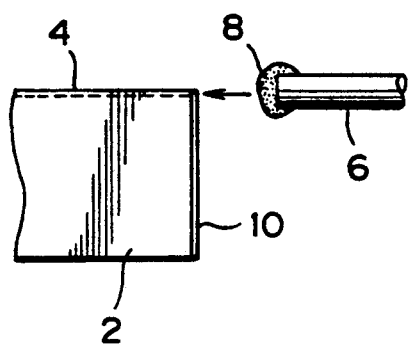
FIG. 3B
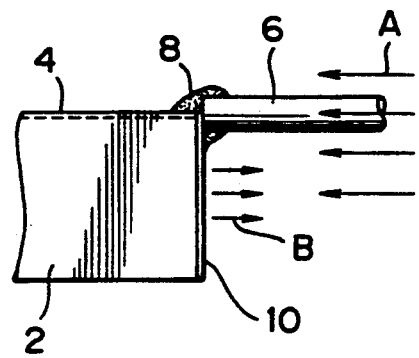

CONNECTING METHOD BETWEEN WAVEGUIDE SUBSTRATE AND OPTICAL FIBER

BACKGROUND OF THE INVENTION

This invention relates to a connecting method between a waveguide substrate made of electro-optical crystal and an optical fiber and to a reflection preventing film with an ultraviolet light intercepting function for use in putting the method into practice.

In order to build up an optical communication system, various optical apparatus such as an optical modulator and an optical switch are required in addition to basic components such as a light source apparatus and a light receiving apparatus. One of forms of optical apparatus is a waveguide type. An optical apparatus of the waveguide type is normally constituted such that a waveguide is formed on a waveguide substrate made of electro-optical crystal and a phase and so forth of a beam of light confined in the waveguide are controlled. An optical apparatus of the waveguide type has an advantage that, due to its structure, miniaturization can be achieved readily and it can be mass-produced using the planer process or the like as well as another advantage that an electric field can be applied effectively and the power consumption can be reduced significantly. When an optical apparatus of such waveguide type is to be incorporated into a system, the optical fiber as an optical transmission line and a waveguide substrate must necessarily be connected to each other both optically and mechanically. Thus, optimization of a connecting method is being sought.

A conventional connecting method between a waveguide substrate and an optical fiber will be described subsequently with reference to FIGS. 1A and 1B. In those figures, reference numeral 2 denotes a waveguide substrate, 4 a waveguide formed on the waveguide substrate 2, and 6 an optical fiber to be connected. When the waveguide substrate 2 and optical fiber 6 are to be connected to each other, a bonding agent 8 of the ultraviolet light curing type is applied to an end portion of the optical fiber 6 as shown in FIG. 1A, and then high precision positional adjustment is performed so that an end face of a core of the optical fiber 6 and an end face of the waveguide 4 may be opposed to each other and closely contacted with each other, whereafter ultraviolet rays are irradiated in the direction as indicated by arrow marks to cause the bonding agent 8 to cure as seen in FIG. 1B. As a result, the waveguide substrate 2 and optical fiber 6 are connected to each other both optically and mechanically. Where such connecting method is employed, since curing of a bonding agent at a normal room temperature is possible, there is no possibility that the loss characteristics may be varied by thermal stress produced at a connecting portion, as different from an alternative case wherein connection is achieved using a thermosetting bonding agent or solder.

Electro-optical crystal which makes a material of a waveguide substrate is particularly $LiNbO_3$ or $LiTaO_3$. However, in case the conventional method is applied to a waveguide substrate made of one of such materials, there is a problem that the waveguide may suffer from optical damage due to an influence of ultraviolet rays which are irradiated in order to cause a bonding agent to cure. Here, optical damage signifies a phenomenon that, when light such as ultraviolet light of a comparatively high intensity is irradiated upon electro-optical crystal of $LiNbO_3$ or the like, excited electrons drop in, in a process in which electrons are excited from an impurity level in the crystal to a conduction band, to a trap level, and a local electric field is produced in the inside of the crystal so that the refraction index is locally varied by way of an electro-optical effect. Such optical damage is recognized as a reversible phenomenon, and after the irradiation of ultraviolet light is stopped, the variation in refractive index is cancelled. However, since such cancellation does not necessarily proceed quickly, optical damage actually matters when an optical apparatus is used. If the refractive index of a waveguide is locally varied by optical damage in this manner, the loss characteristics of the optical apparatus of the waveguide type may be deteriorated or the operating point (for example, a bias potential in the case of an optical modulator of the waveguide type) may be varied.

SUMMARY OF THE INVENTION

Accordingly, it is an object of the present invention to provide a connecting method between a waveguide substrate and an optical fiber which does not possibly cause optical damage.

Another object of the present invention is to provide a reflection preventing film with an ultraviolet light intercepting function which is used directly for the connecting method described just above.

In accordance with an aspect of the present invention, there is provided a method of connecting a waveguide substrate made of electro-optical crystal and an optical fiber by means of a bonding agent of the ultraviolet light curing type, which comprises the steps of forming, at least at and around a portion of an end face of the waveguide substrate at which an end face of the optical fiber is to be closely contacted, a reflection preventing film with an ultraviolet light intercepting function of passing therethrough light of a wavelength which is to be transmitted by way of the optical fiber but intercepting ultraviolet light of a wavelength with which the bonding agent cures, contacting the end face of the optical fiber closely with the reflection preventing film with the bonding agent of the ultraviolet light curing type applied to the end face of the optical fiber, adjusting a relative positional relationship between the waveguide substrate and the optical fiber, and irradiating ultraviolet rays upon the end face of the waveguide substrate from the side on which the reflection preventing film is formed.

Preferably, the connecting method further comprises the step of transmitting ultraviolet rays in the optical fiber to cause the bonding agent to cure.

In accordance with another aspect of the present invention, there is provided a reflection preventing film with an ultraviolet light intercepting function which is used directly in putting the connecting method described above into practice, wherein a Si layer and a $SiO_2$ layer are laminated alternately by a plurality layers on a waveguide substrate made of electro-optical crystal. Here the number of Si and $SiO_2$ layers may range from 5 to 10. Selection of materials of individual layers and design values of thicknesses of individual layers are defined specifically in accordance with the number of layers.

With the method of the present invention described above, it is possible to connect a waveguide substrate and an optical fiber to each other without causing optical damage. The reflection preventing film with an ultraviolet light intercepting function which is used in the method of the present invention can be reduced in Fresnel loss to reduce connection loss because it has a reflection preventing function for light of a wavelength to be transmitted.

Further, with the layer structure of the reflection preventing film with an ultraviolet light intercepting function which is used in putting the method of the present invention into practice, the reflection preventing film can pass therethrough light of a band of the wavelength of 1.55 μm to be transmitted by way of the optical fiber but can intercept, at a high intercepting rate, ultraviolet rays with which the bonding agent cures.

The above and other objects, features and advantages of the present invention and the manner of realizing them will become more apparent, and the invention itself will best be understood, from a study of the following description and appended claims with reference had to the attached drawings showing some preferred embodiments of the invention.

BRIEF DESCRIPTION OF THE DRAWINGS

FIGS. 1A and 1B are illustrative views of a conventional connecting method between a waveguide substrate and an optical fiber;

FIG. 2 is a perspective view of an optical apparatus of the waveguide type which is used in an embodiment of a connecting method of the present invention;

FIGS. 3A and 3B are views illustrating the embodiment of the connecting method of the present invention.

DESCRIPTION OF THE PREFERRED EMBODIMENT

Figure 4:
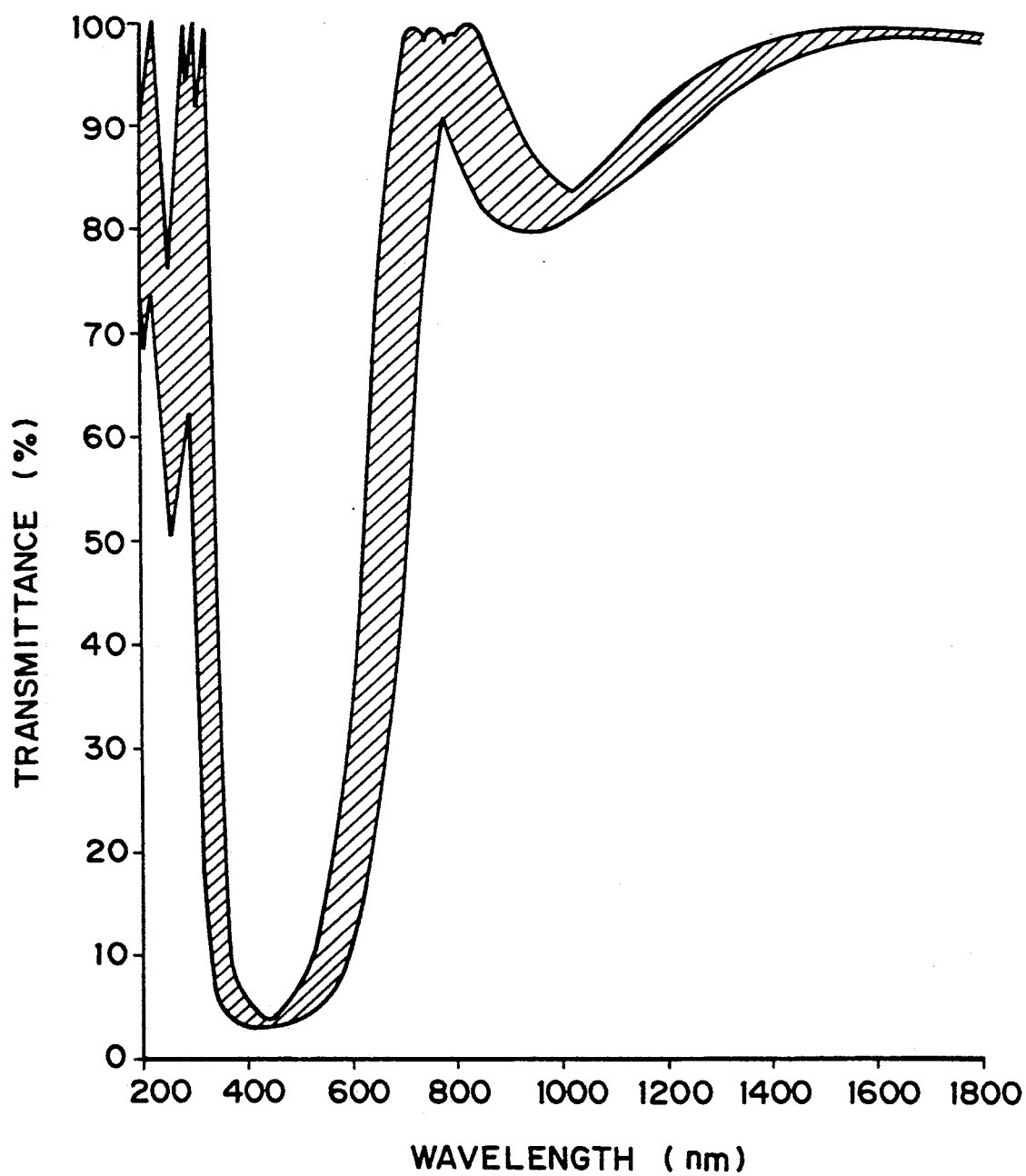
FIGS. 4 to 9 are graphs individually showing ranges characteristic curves can take when the deviation in thickness of layers is ±10% where the number of layers of a reflection preventing film is 5 to 10, respectively.

In the following, embodiments of the present invention will be described with reference to the drawings.

FIG. 2 is a perspective view of an optical apparatus of the waveguide type which is used in an embodiment of the present invention, and the optical apparatus particularly is an optical modulator which intensity modulates a laser beam received with a fixed intensity and outputs the modulated light. The apparatus is constituted such that a waveguide 4 of the Mach-Zehnder type is formed by partly diffusing, for example, Ti (titanium) into a waveguide substrate 2 made of $LiNbO_3$, and a pair of electrodes 12 and 14 for the application of a driving voltage are mounted at branching portions 4a and 4b of the waveguide 4.

Since the refractive index of each of the branching portions 4a and 4b of the waveguide varies in response to an electric field applied thereto, if a potential difference is applied between the electrodes 12 and 14, then beams of light branched in same phases will undergo different phase variations. Meanwhile, since the waveguide 4 is a single mode waveguide which transmits only light of a basic mode except the Y-branching portion, when the phase difference between the branched beams of light when they are to be combined is equal to 0, the intensity of interference light to be outputted is maximum, but when the phase difference of the branched beams of light when they are to be combined is equal to $\pi$, the intensity of interference light is minimum. In the meantime, when the phase difference assumes a value between 0 and $\pi$, interference light has an intensity depending upon the phase difference. Accordingly, a light intensity modulating function is achieved by changing the voltage to be applied between the electrodes 12 and 14 in response to a modulating signal.

In an optical apparatus of the waveguide type which makes use of a fine variation in refractive index of a waveguide as described above, the operation characteristics may be varied over a wide range by an influence of such optical damage as described above. Thus, in order to eliminate an influence of optical damage, a method of the present invention is applied to such connection between an optical apparatus and an optical fiber.

Subsequently, an embodiment of a connecting method of the present invention will be described with reference to FIGS. 3A and 3B. First, prior to a connecting operation, a reflection preventing film 10 with an ultraviolet light intercepting function of passing therethrough light of a band of a wavelength of 1.55 μm but intercepting ultraviolet rays of a wavelength of 0.43 μm is formed at least at and around a portion of an end face of a waveguide substrate 2 at which an end face of an optical fiber 6 is to be closely contacted as shown in FIG. 3A. The wavelength of light to pass through the reflection preventing film 10 may be, in addition to the 1.55 μm band as described above, a 1.3 μm band. Also the wavelength of ultraviolet rays is not limited to 0.43 μm, but ultraviolet rays of any other wavelength with which a bonding agent of the ultraviolet light curing type cures may be used. The reflection preventing film 10 can be formed by an ordinary method such as electron beam vapor deposition. In the present embodiment, the reflection preventing film 10 is formed on an entire end face of the waveguide substrate 2.

Meanwhile, a bonding agent 8 of the ultraviolet light curing type is applied to an end portion of the optical fiber 6 to be connected as shown in FIG. 3A. In this instance, though not shown, the bonding agent 8 may be applied to and around a corresponding portion of the reflection preventing film 10 on the waveguide 4.

Subsequently, the end face of the optical fiber 6 is closely contacted with the reflection preventing film 10 such that the end face of the core of the optical fiber 6 may be opposed to the end face of the waveguide 4 with the bonding agent 8 applied to the end face of the optical fiber 6. In this instance, adjustment of the relative positional relationship between the optical fiber 6 and the waveguide substrate 2 can be performed while measuring an actual optical coupling efficiency between them.

After then, ultraviolet rays are irradiated upon the bonding agent 8 applied to the reflection preventing film 10 in a direction substantially perpendicular to the end face of the waveguide substrate 2 as indicated by arrow marks A in FIG. 3B to cause the bonding agent 8 to cure. While the bonding agent 8 cures from an outer peripheral portion thereof by irradiation of ultraviolet rays, there is the possibility that a central portion of the bonding agent 8 may not cure by irradiation of ultraviolet rays for a comparatively short period of time, and accordingly, it is desirable to transmit ultraviolet rays in the optical fiber 6 to positively cause the central portion of the bonding agent 8 to cure.

Since ultraviolet rays are irradiated in a direction substantially perpendicular to the end face of the waveguide substrate 2, such a situation will not take place that ultraviolet rays are admitted directly into the waveguide 4 to cause optical damage to the waveguide 4. However, the direction of irradiation of ultraviolet rays is not limited to such perpendicular direction as shown in FIG. 3B, but ultraviolet rays may be irradiated from an obliquely upper position upon the end face of the waveguide substrate 2 on which the reflection preventing film 10 is formed. Since the reflection preventing film 10 with an ultraviolet right intercepting function is formed on the end face of the waveguide substrate 2, such a situation will not take place that ultraviolet rays irradiated are admitted into the waveguide substrate 2 by way of the end face thereof and then into the waveguide 4. Further, since ultraviolet rays reflected from the reflection preventing film 10 are radiated in a direction in which they go away from the waveguide substrate 2, that is, in the direction indicated by arrow marks B in FIG. 3B, the waveguide 4 will not suffer from optical damage by such reflected light. Accordingly, when connection between an optical fiber and a waveguide substrate is to be performed by the present method, characteristics of an optical apparatus of the waveguide type will not be put into an unstable condition by an influence of optical damage.

Subsequently, structure of a reflection preventing film with an ultraviolet light intercepting function which is used directly in putting the connecting method described above into practice will be described. The reflection preventing film is formed by laminating a Si layer and a SiO₂ layer alternately by 5 to 10 layers on a waveguide substrate made of electrooptical crystal, and selection of materials of individual layers and design values of the individual layers are such as given in the following tables for the numbers of layers.

In each table, a value indicative of a film thickness is a relative value when the film thickness corresponding to one fourth a central wavelength of ultraviolet light to be intercepted is represented by 1.0.

(a) In the case the number of layers is 5

|  | Material | Film Thickness |
| --- | --- | --- |
| First Layer (Substrate Side) | Si | 1.09 |
| Second Layer | SiO2 | 0.92 |
| Third layer | Si | 0.96 |
| Fourth Layer | SiO2 | 1.07 |
| Fifth Layer | Si | 0.91 |

(b) In the case the number of layers is 6

|  | Material | Film Thickness |
| --- | --- | --- |
| First Layer (Substrate Side) | SiO₂ | 0.83 |
| Second Layer | Si | 1.25 |
| Third layer | SiO₂ | 0.96 |
| Fourth Layer | Si | 0.84 |
| Fifth Layer | SiO₂ | 1.24 |
| Sixth Layer | Si | 0.82 |

(c) In the case the number of layers is 7

|  | Material | Film Thickness |
| --- | --- | --- |
| First Layer (Substrate Side) | Si | 0.87 |
| Second Layer | SiO₂ | 0.85 |
| Third layer | Si | 1.24 |
| Fourth Layer | SiO₂ | 0.79 |
| Fifth Layer | Si | 0.82 |
| Sixth Layer | SiO2 | 1.29 |
| Seventh Layer | Si | 0.70 |

(d) In the case the number of layers is 8

|  | Material | Film Thickness |
| --- | --- | --- |
| First Layer (Substrate Side) | SiO₂ | 1.11 |
| Second Layer | Si | 0.92 |
| Third layer | SiO₂ | 0.96 |
| Fourth Layer | Si | 1.19 |
| Fifth Layer | SiO₂ | 0.89 |
| Sixth Layer | Si | 1.00 |
| Seventh Layer | SiO₂ | 1.09 |
| Eighth Layer | Si | 0.87 |

(e) In the case the number of layers is 9

|  | Material | Film Thickness |
| --- | --- | --- |
| First Layer (Substrate Side) | Si | 0.70 |
| Second Layer | SiO₂ | 1.27 |
| Third layer | Si | 0.99 |
| Fourth Layer | SiO₂ | 0.83 |
| Fifth Layer | Si | 1.21 |
| Sixth Layer | SiO₂ | 0.93 |
| Seventh Layer | Si | 0.86 |
| Eighth Layer | SiO₂ | 1.26 |
| Ninth Layer | Si | 0.80 |

(f) In the case the number of layers is 10

|  | Material | Film Thickness |
| --- | --- | --- |
| First Layer (Substrate Side) | SiO₂ | 0.93 |
| Second Layer | Si | 0.92 |
| Third layer | SiO₂ | 1.35 |
| Fourth Layer | Si | 1.00 |
| Fifth Layer | SiO₂ | 0.87 |
| Sixth Layer | Si | 1.23 |
| Seventh Layer | SiO₂ | 1.00 |
| Eighth Layer | Si | 0.86 |
| Ninth Layer | SiO₂ | 1.17 |
| Tenth Layer | Si | 0.50 |

Figure 5:
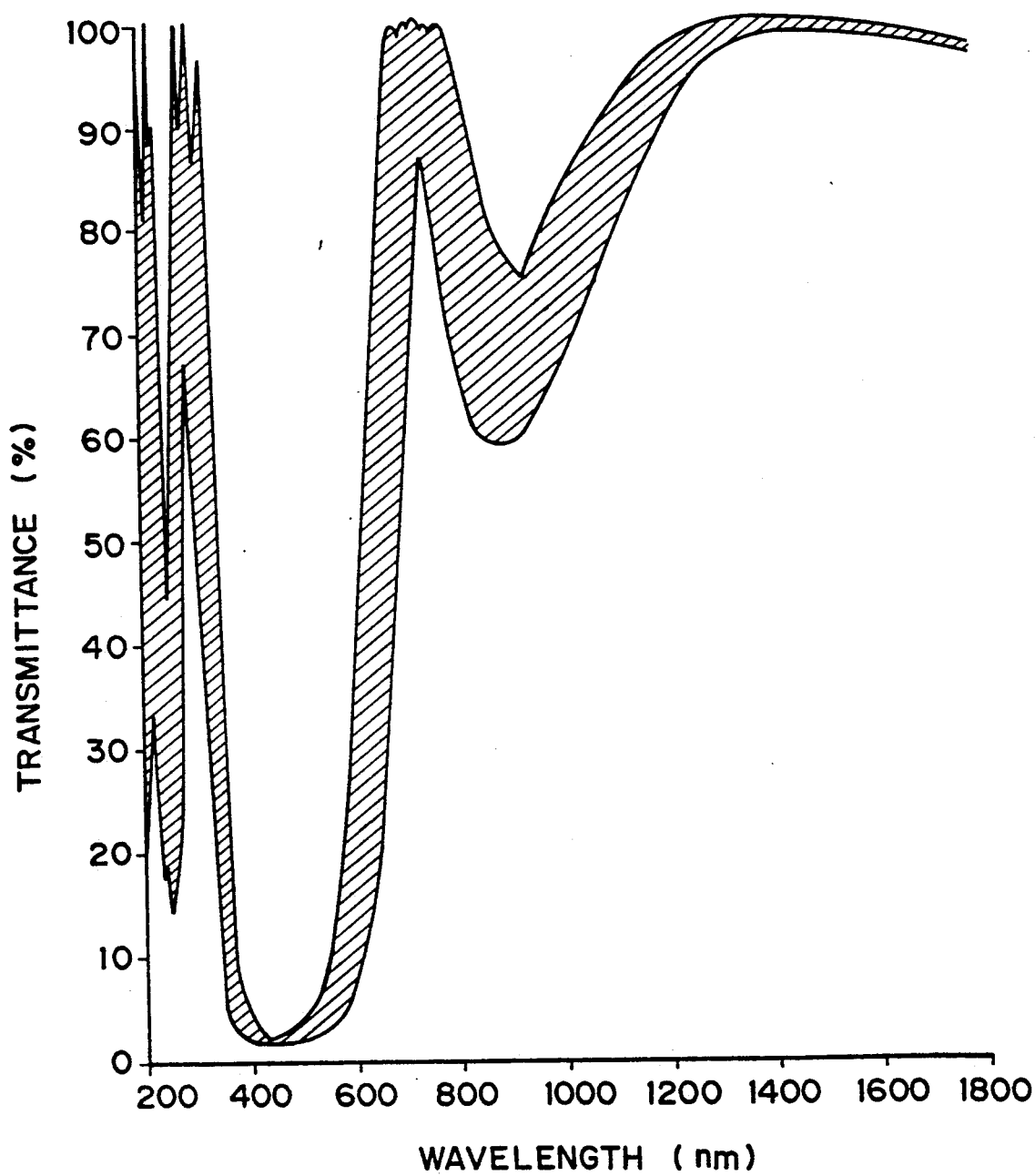
Figure 6:
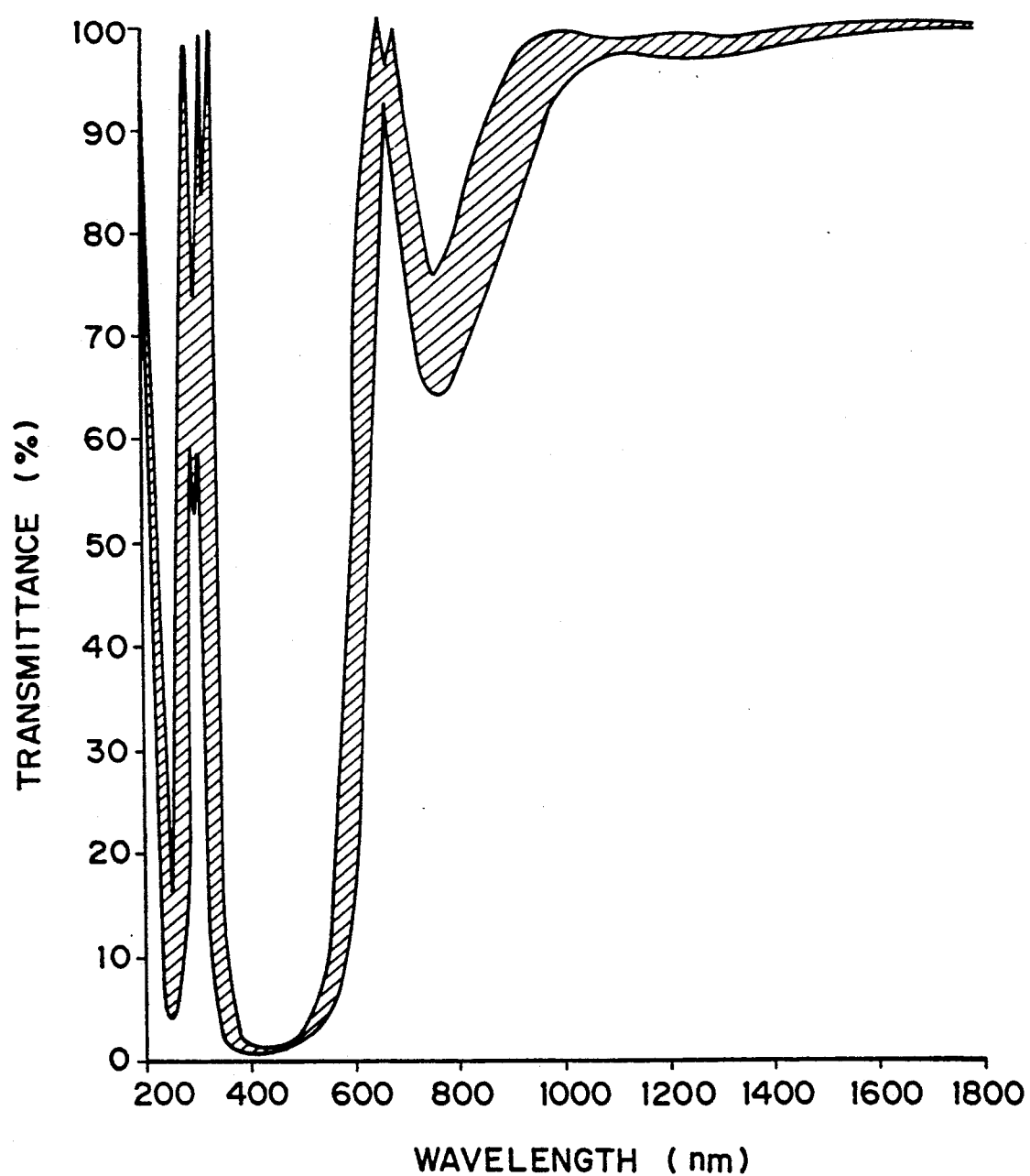
Figure 7:
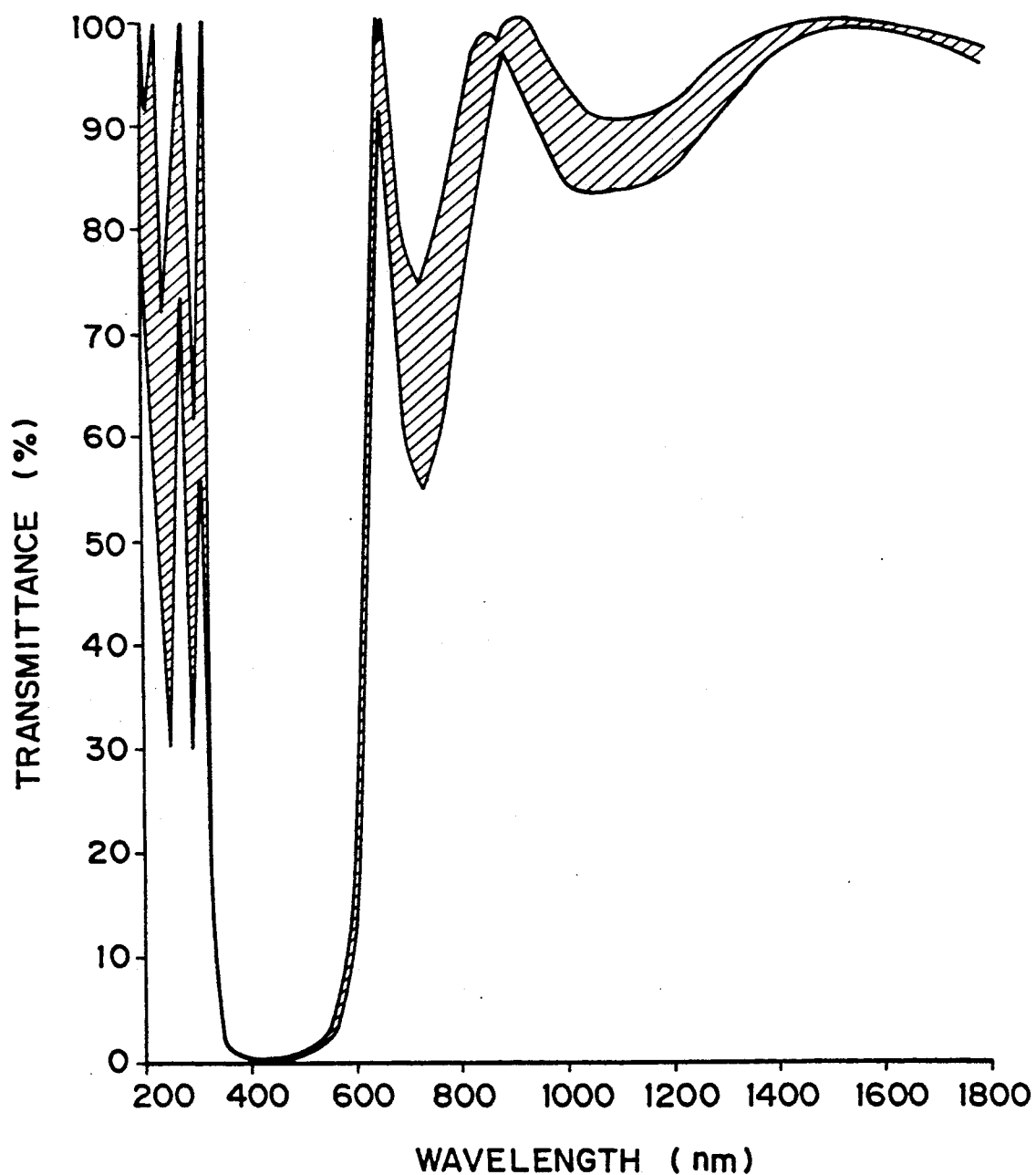
Figure 8:
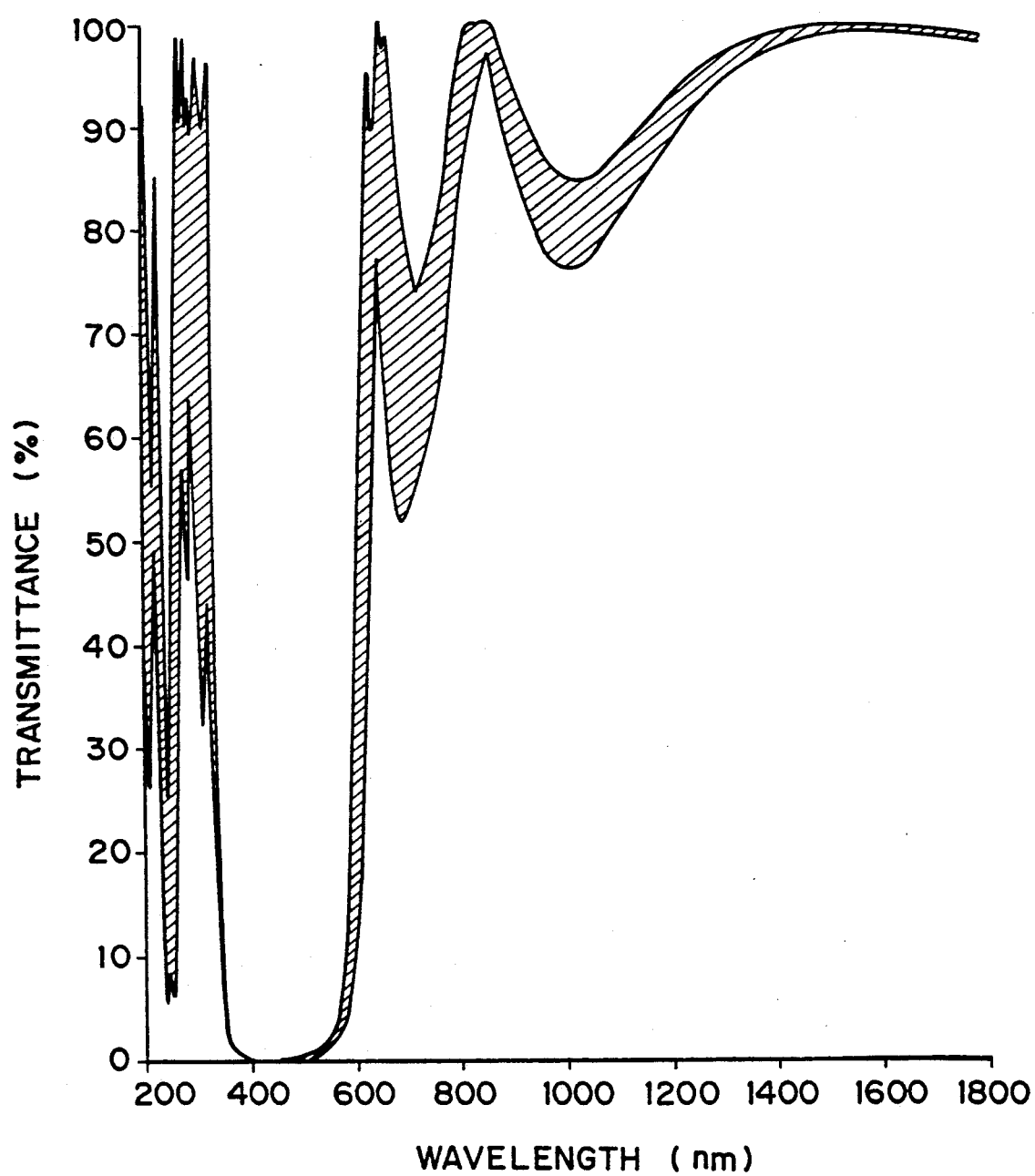
Figure 9:
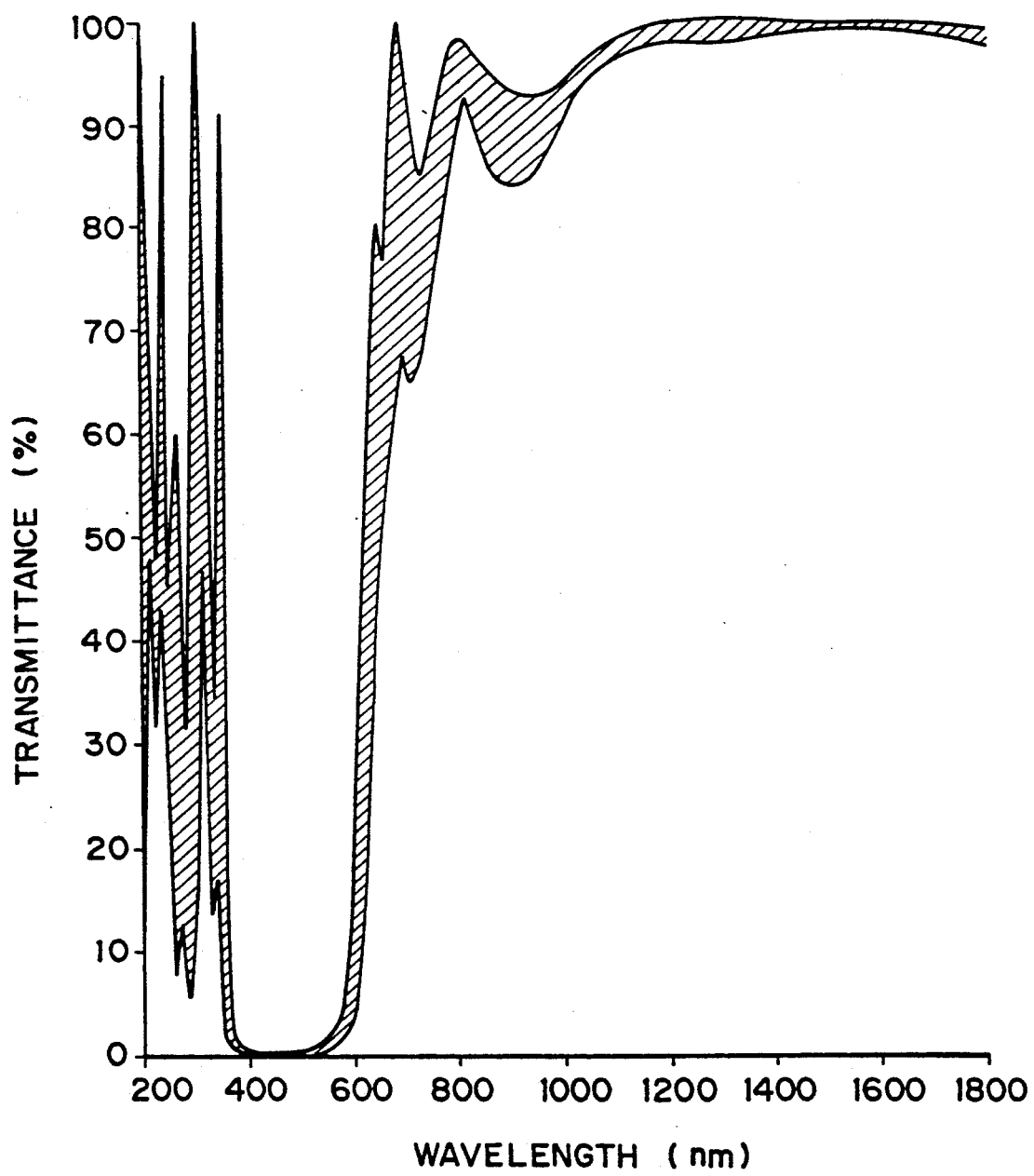

Ranges the characteristic curves (curves indicative of relationships between a transmission factor and a wavelength) can take when the deviation in film thickness among individual layers is ±10% where the number of layers of a reflection preventing film with an ultraviolet light intercepting function is 5 to 10 as given above are shown in FIGS. 4 to 9, respectively. Those layer structures are optimally designed for the case wherein the angle of incidence is 0 degrees, and as far as the deviation in thickness among layers remains within the above range, the layer structures have a transmission factor of higher than 99.5% with regard to light of the wavelength of 1.55 μm. Accordingly, they present a sufficient reflection preventing function with regard to light to be transmitted having wavelength of the 1.55 μm band. Further, where the deviation in film thickness among individual layers remains within the range described above, they can present a sufficient intercepting function with regard to ultraviolet rays having a wavelength of 0.43 μm. While the intercepting function to ultraviolet rays increases as the number of layers increases, the number of layers of Si and SiO₂ layers is sufficient with 5 to 10 in practical use.

What is claimed is:

1. A method of connecting a waveguide substrate made of electro-optical crystal and an optical fiber by means of a bonding agent of the ultraviolet light curing type, comprising the steps of:

forming, at least at and around a portion of an end face of the waveguide substrate at which an end face of the optical fiber is to be closely contacted, a reflection preventing film with an ultraviolet light intercepting function of passing therethrough light of a wavelength which is to be transmitted by way of the optical fiber but intercepting ultraviolet light of a wavelength with which the bonding agent cures;

contacting the end face of the optical fiber closely with the reflection preventing film with the bonding agent of the ultraviolet light curing type applied to the end face of the optical fiber;

adjusting a relative positional relationship between the waveguide substrate and the optical fiber; and irradiating ultraviolet rays upon the end face of the waveguide substrate from the side on which the reflection preventing film is formed.

2. A method according to claim 1, further comprising the step of transmitting ultraviolet rays in the optical fiber to cause the bonding agent to cure.

3. A method according to claim 1, wherein ultraviolet rays are irradiated in a direction substantially perpendicular to the end face of the waveguide substrate.

4. A combination for optically coupling an optical fiber to a waveguide on a waveguide substrate, comprising:

a waveguide substrate made of electro-optical crystal and having at least one waveguide formed thereon;

a reflection preventing film with an ultraviolet light intercepting function formed on an end face of said waveguide substrate; and an optical fiber adhered to said reflection preventing film in an opposing relationship to said waveguide of said waveguide substrate by means of a bonding agent of the ultraviolet light curing type.

5. A combination according to claim 4, wherein said reflection preventing film comprises a Si layer and a SiO₂ layer laminated alternatively by five layers on a waveguide substrate made of electro-optical crystal wherein a first layer which directly contacts with said waveguide substrate is a Si layer, and wherein the reflection preventing film has a thickness equal to one fourth the central wavelength of ultraviolet light to be intercepted and is represented as 1.0 and the thicknesses of the first to fifth layers are equal to 1.09, 0.92, 0.96, 1.07 and 0.91, respectively.

6. A combination according to claim 4, wherein said reflection preventing film comprises a Si layer and a SiO₂ layer laminated alternatively by five layers on a waveguide substrate made of electro-optical crystal wherein a first layer which directly contacts with said waveguide substrate is a Si layer, and wherein the reflection preventing film has a thickness equal to one fourth the central wavelength of ultraviolet light to be intercepted and is represented as 1.0 and the thicknesses of the first to fifth layers are equal to 0.83, 1.25, 0.96, 0.84, 1.24 and 0.82, respectively.

7. A combination according to claim 4, wherein said reflection preventing film comprises a Si layer and a SiO₂ layer laminated alternatively by five layers on a waveguide substrate made of electro-optical crystal wherein a first layer which directly contacts with said waveguide substrate is a Si layer, and wherein the reflection preventing film has a thickness equal to one fourth the central wavelength of ultraviolet light to be intercepted and is represented as 1.0 and the thicknesses of the first to fifth layers are equal to 0.87, 0.85, 1.24, 0.79, 0.82, 1.29 and 0.70, respectively.

8. A combination according to claim 4, wherein said reflection preventing film comprises a Si layer and a SiO₂ layer laminated alternatively by five layers on a waveguide substrate made of electro-optical crystal wherein a first layer which directly contacts with said waveguide substrate is a Si layer, and wherein the reflection preventing film has a thickness equal to one fourth the central wavelength of ultraviolet light to be intercepted and is represented as 1.0 and the thicknesses of the first to fifth layers are equal to 1.11, 0.92, 0.96, 1.10, 0.89, 1.00, 1.09 and 0.87, respectively.

9. A combination according to claim 4, wherein said reflection preventing film comprises a Si layer and a SiO₂ layer laminated alternatively by five layers on a waveguide substrate made of electro-optical crystal wherein a first layer which directly contacts with said waveguide substrate is a Si layer, and wherein the reflection preventing film has a thickness equal to one fourth the central wavelength of ultraviolet light to be intercepted and is represented as 1.0 and the thicknesses of the first to fifth layers are equal to 0.70, 1.27, 0.99, 0.83, 1.21, 0.93, 0.86, 1.26 and 0.80, respectively.

10. A combination according to claim 4, wherein said reflection preventing film comprises a Si layer and a SiO₂ layer laminated alternatively by five layers on a waveguide substrate made of electro-optical crystal wherein a first layer which directly contacts with said waveguide substrate is a Si layer, and wherein the reflection preventing film has a thickness equal to one fourth the central wavelength of ultraviolet light to be intercepted and is represented as 1.0 and the thicknesses of the first to fifth layers are equal to 0.93, 0.92, 1.35, 1.00, 0.87, 1.23, 1.00, 0.86, 1.17 and 0.50, respectively.

* * * * *